(12) United States Patent
Dukes

(10) Patent No.: US 8,281,749 B2
(45) Date of Patent: Oct. 9, 2012

(54) PET ACCESSORY PENDANT

(75) Inventor: Ricky Lynn Dukes, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 193 days.

(21) Appl. No.: 12/892,559

(22) Filed: Sep. 28, 2010

(65) Prior Publication Data

US 2012/0073517 A1   Mar. 29, 2012

(51) Int. Cl.
*A01K 29/00* (2006.01)

(52) U.S. Cl. ........................................ 119/859

(58) Field of Classification Search ............... 119/859, 119/856, 863, 718, 719, 720, 721, 864, 858; D30/155; 63/1.11, 1.14, 1.18, 12, 18, 19
See application file for complete search history.

(56) References Cited

U.S. PATENT DOCUMENTS

| | | | |
|---|---|---|---|
| 3,159,140 A * | 12/1964 | Miller | 119/719 |
| D228,646 S * | 10/1973 | Kissin | D30/152 |
| 4,197,665 A * | 4/1980 | Siiter | 40/365 |
| 4,407,233 A * | 10/1983 | Bozzacco | 359/518 |
| D301,318 S * | 5/1989 | Yoshida | D11/79 |
| 5,647,303 A * | 7/1997 | Deioma | 119/864 |
| 6,263,836 B1 | 7/2001 | Hollis | |
| 6,349,671 B1 | 2/2002 | Lewis et al. | |
| 6,367,426 B1 | 4/2002 | Schaible | |
| 7,021,247 B1 | 4/2006 | Seeno et al. | |
| 7,121,117 B2 * | 10/2006 | Gruosi-Scheufele | 63/1.14 |
| 7,296,541 B2 * | 11/2007 | Fredland et al. | 119/858 |
| 7,877,844 B2 * | 2/2011 | Nichols et al. | 24/3.11 |
| 8,125,774 B2 * | 2/2012 | Kelley et al. | 361/679.31 |
| 2003/0013420 A1 | 1/2003 | Redmond | |
| 2004/0206310 A1 | 10/2004 | Hutchins | |
| 2005/0263106 A1 | 12/2005 | Steinbacher | |
| 2006/0102100 A1 | 5/2006 | Becker et al. | |
| 2008/0163829 A1 | 7/2008 | Lee et al. | |

* cited by examiner

*Primary Examiner* — Yvonne Abbott
(74) *Attorney, Agent, or Firm* — Pitts & Lake, PC

(57) ABSTRACT

A pet accessory pendant is provided. The pet accessory pendant houses components for a pet accessory, such as a bark control device, a containment fence receiver, a remote trainer, a pet locator, and the like. The pet accessory pendant is mountable to animal collars of various sizes, lengths, widths, and thicknesses. Specifically, the pet accessory pendant is attachable to an animal collar such that the pet accessory pendant comfortably hangs in a pendant fashion and minimizes pressure points on the animal. Additionally, the pet accessory pendant is readily attachable to and detachable from the collar without removing the animal collar from the animal, thereby reducing the need to adjust the fitment of the pet accessory pendant for each use. Thus, the pet accessory pendant allows a single animal collar to be easily converted between a general-purpose animal collar and an animal collar with attached pet accessory. Furthermore, the ease of attachment and detachment allows for quickly changing pet accessories, leashing the animal without removing the animal collar to detach the pet accessory, replacing the battery, or modifying the pet accessory controls.

19 Claims, 5 Drawing Sheets

PET ACCESSORY PENDANT

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

The invention pertains to pet accessories. More specifically, the invention pertains to a housing and the attachment of a pet accessory to an animal collar.

2. Description of the Related Art

Electronic pet accessories and training devices, such as a bark control device, a containment fence receiver, a remote trainer, a pet locator, and the like, are commonly used for providing information about an animal and/or for modifying the animal's behavior. Typically, these conventional pet accessories and training devices include a housing and a collar that are specifically made for one another. One type of conventional pet accessory includes a housing having collar brackets disposed on opposing sides of the housing which receive a particular collar having a specified thickness and width, such as illustrated in U.S. Pat. No. 5,927,233. Another type of conventional pet accessory includes a collar having a group of openings configured to be aligned with a threaded connector on the housing such that a portion of a probe extends through the opening and is received by the threaded connector thereby securing the collar between the housing and probe, such as illustrated in U.S. Pat. No. 7,222,589. In yet another type of conventional pet accessory, the housing is integrally molded and inseparable from the collar or the housing is configured to be secured to the collar and define a single piece, such as illustrated in U.S. Pat. No. 7,644,685 or U.S. Pat. No. 7,574,979. Thus, the collar for any of these conventional pet accessories is essentially non-interchangeable with animal collars of various sizes, lengths, widths, and thicknesses.

BRIEF SUMMARY OF THE INVENTION

The pet accessory pendant includes one or more attachment loops and a housing for a pet accessory, such as a bark control device, a containment fence receiver, a remote trainer, a pet locator, and the like. The housing houses and protects components of the pet accessory. The attachment loops are connected to the housing and each define an opening configured to receive an animal collar. As used herein, an "animal collar" refers to any securing device that encircles a portion of the animal, including, but not limited to, collars, belts, martingales, and harness. The opening's dimensions allow it to receive an animal collar selected from an assortment of animal collars of various sizes, lengths, widths, and thicknesses. The pet accessory pendant is attachable to the animal collar such that the pet accessory pendant comfortably hangs in a pendant fashion and minimizes pressure points on the animal. Additionally, the pet accessory pendant is readily attachable to and detachable from the collar such that the animal collar does not have to be removed from the animal, thereby reducing the need to adjust the fitment of the pet accessory pendant for each use. Thus, the pet accessory pendant allows a single animal collar to be easily converted between a general-purpose animal collar and an animal collar with an attached pet accessory.

BRIEF DESCRIPTION OF THE SEVERAL VIEWS OF THE DRAWINGS

The above-mentioned features of the invention will become more clearly understood from the following detailed description of the invention read together with the drawings in which.

DETAILED DESCRIPTION OF THE INVENTION

A pet accessory pendant is described in detail herein and shown in the accompanying figures. The pet accessory pendant houses components for a pet accessory, such as a bark control device, a containment fence receiver, a remote trainer, a pet locator, and the like. The pet accessory pendant is mountable to an assortment of animal collars having various sizes, lengths, widths, and thicknesses. More specifically, the pet accessory pendant is attachable to an animal collar such that the pet accessory pendant comfortably hangs in a pendant fashion and minimizes pressure points on the animal. Additionally, the pet accessory pendant is readily attachable to and detachable from the animal collar without requiring the animal collar to be removed from the animal, thereby reducing the need to adjust the fitment of the animal collar and pet accessory pendant for each use. Thus, the pet accessory pendant allows a single animal collar to be easily converted between a general-purpose animal collar and an animal collar with an attached pet accessory and provides the consumer with greater freedom to select a collar for the animal.

As used herein, an "animal collar" refers to any securing device that encircles a portion of the animal, including, but not limited to, collars, belts, martingales, and harnesses.

Figure 1:
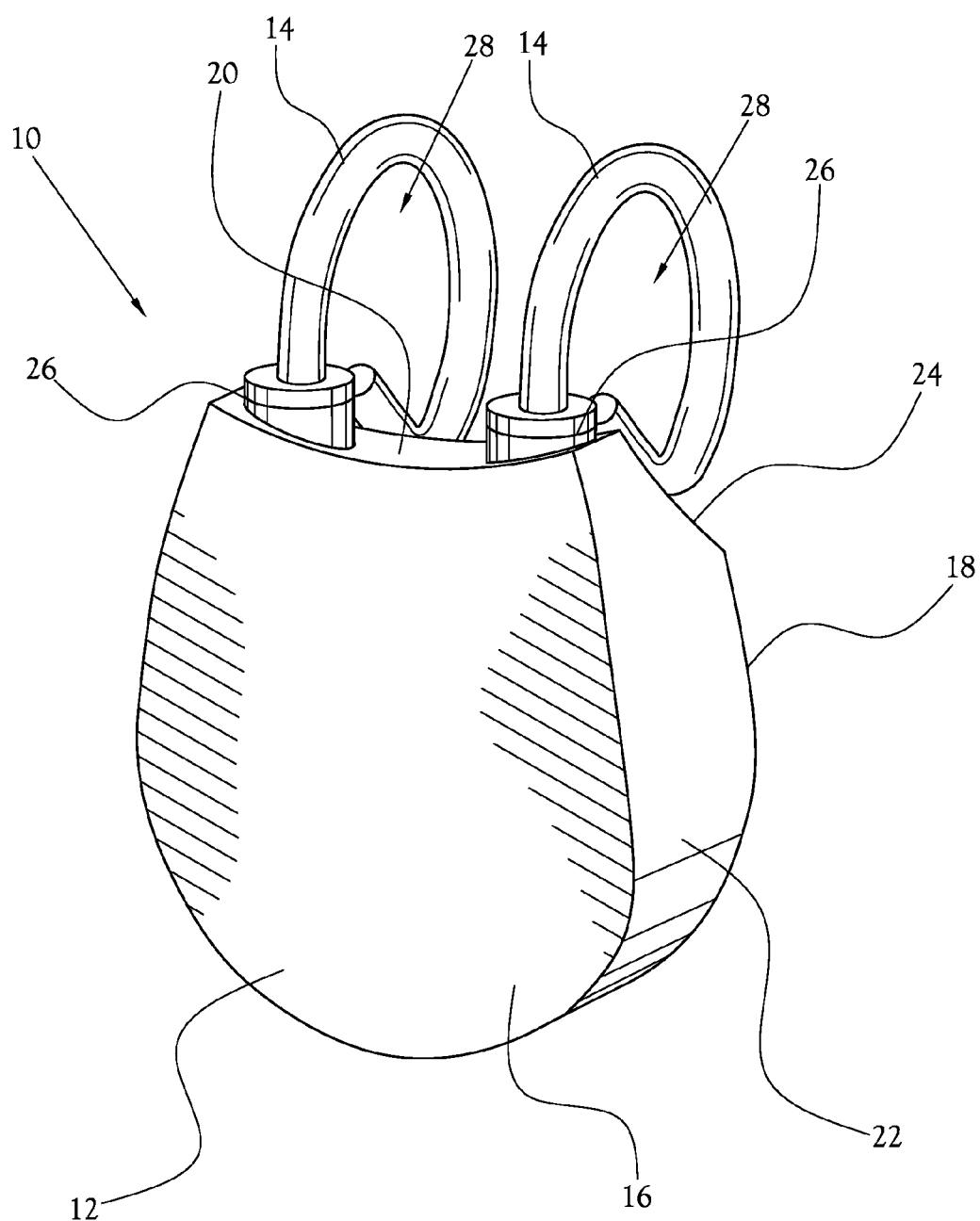
FIG. 1 illustrates a perspective view of one embodiment of the pet accessory pendant.

FIG. 1 illustrates one embodiment of the pet accessory pendant. The pet accessory pendant 10 includes a housing 12 and one or more attachment loops 14. The housing 12 encloses the components for the pet accessory, such as the electronics for a bark control device, a containment fence receiver, a remote trainer, a pet locator, or the like. The housing 12 also protects these components from damage, such as the impacts and wear attributed to being carried by the animal. Other considerations for selecting the housing 12 include, but are not limited to, the overall durability of the material, the weather resistance, and the chew resistance. For example, in one embodiment, the housing 12 is fabricated from a rigid plastic.

The housing 12 is three dimensional and hollow such that a cavity defined therein has sufficient size to accommodate the pet accessory components. The overall size of the housing 12 is influenced by the area needed to accommodate the pet accessory components. In the illustrated embodiment, the housing 12 has a generally semicircular shape that defines a flat front surface 16, a flat back surface 18, a top surface 20, side surfaces 22, and an angled surface 24 extending between the top surface 20 and back surface 18. In one embodiment, the shape of the housing 12 is also arranged such that the housing 12 does not project into the animal's throat when secured to an animal collar. For example, in the illustrated embodiment, the contour of the housing 12 minimizes edges between the surfaces, and more specifically, the edges are beveled to reduce the projections into the animal's throat.

The pet accessory pendant 10 provides one or more attachment loops 14 for mounting the housing 12 to an animal collar. Each attachment loop 14 is connected to the housing 12. In the illustrated embodiment, the attachment loops 14 are connected at one end to the top surface 20 of the housing 12. Additionally, the depicted pet accessory pendant 10 further includes a seal 26 for the connection between the housing 12 and the attachment loops 14 to create a substantially air/water tight seal to protect the pet accessory components from the environment.

Each attachment loop 14 projects outward from the housing 12 and defines an opening such that the animal collar is receivable within the opening 28 to secure the pet accessory pendant 10 on the animal collar. For example, in one embodiment, the animal collar is unbuckled and threaded through the attachment loops 14 such that the pet accessory pendant 10 hangs in a pendent fashion on the animal collar and is able to move along the length of the animal collar. Accordingly, the attachment loops 14 are fabricated from a durable material that assures the housing 12 remains secured to the animal collar. In one embodiment, the attachment loop 14 is fabricated from a rigid material, such as metal. Moreover, the opening 28 defined by each attachment loop 14 is sufficiently large enough to receive an assortment of collars having various sizes, lengths, widths, and thicknesses.

Figure 2:
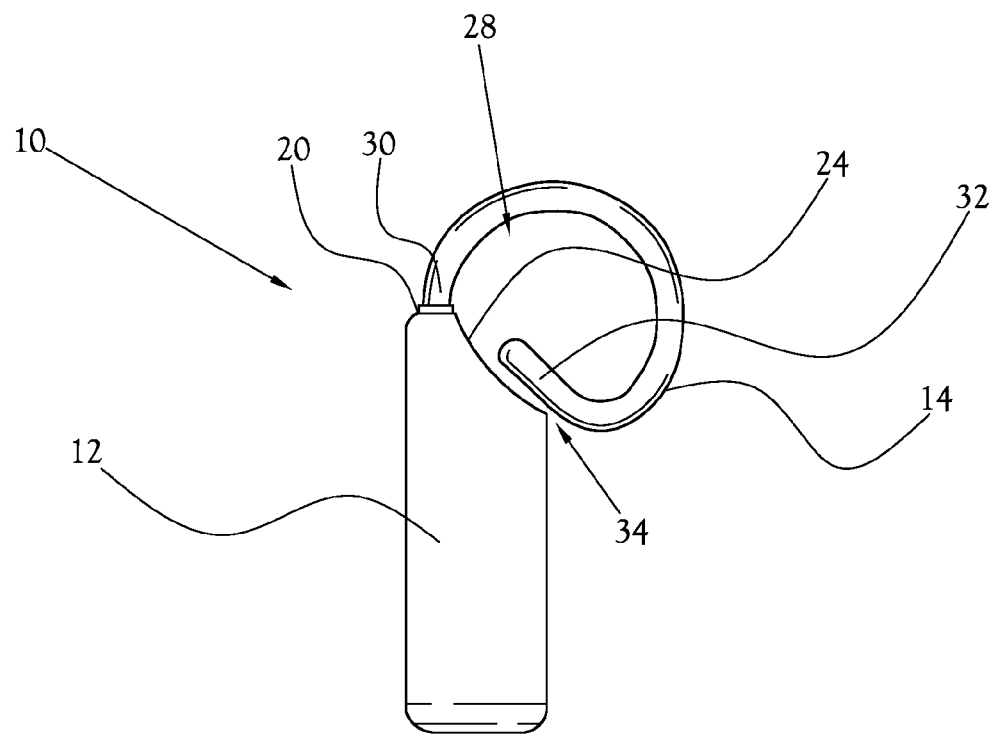
FIG. 2 illustrates a side view of the embodiment of the pet accessory pendant depicted in FIG. 1.

FIG. 2 illustrates, in greater detail, the embodiment of the pet accessory pendant 10 as depicted in FIG. 1. In the illustrated embodiment, the attachment loop 14 is positioned near the angled surface 24 of the housing 12. The attachment loop 14 is arranged in a "D" shape having a flattened portion near the angled surface 24 and an arcuate portion having a gradual curve, which faces the animal when secured to the animal collar. More specifically, the attachment loop 14 is an open loop having a first end 30 connected to the top surface 20 and a second end 32 running substantially parallel to and offset from a portion of the housing 12 to define a collar passageway 34. In the illustrated embodiment, the second end 32 overlaps and cooperates with the angled surface 24 to define a collar passageway 34. The collar passageway 34 provides an alternate method of attachment and detachment of the pet accessory pendant 10 without removal of the animal collar from the animal. Specifically, the collar passageway 34 provides a path for the animal collar to enter and exit the opening 28 defined by the attachment loop 14. The ease of attachment and detachment allows for quickly changing pet accessories, leashing the animal without removing the animal collar to detach the pet accessory, replacing the battery, or modifying the pet accessory controls, and other desirable features.

Furthermore, the collar passageway 34 allows the pet accessory pendant 10 to be secured to other types of animal restraint devices, such as martingales or harnesses, which typically cannot be used with aftermarket pet accessories due to their design. Traditionally, to use a pet accessory with these other types of animal restraints, the animal must wear the animal restraint device in addition to an animal collar having a pet accessory. By utilizing the collar passageway 34, the pet accessory pendant 10 is attachable to a previously inaccessible strap on these animal restraint devices. Accordingly, the pet accessory pendant 10 eliminates the necessity to wear multiple animal restraints in order for the animal to carry a pet accessory.

Figure 3:
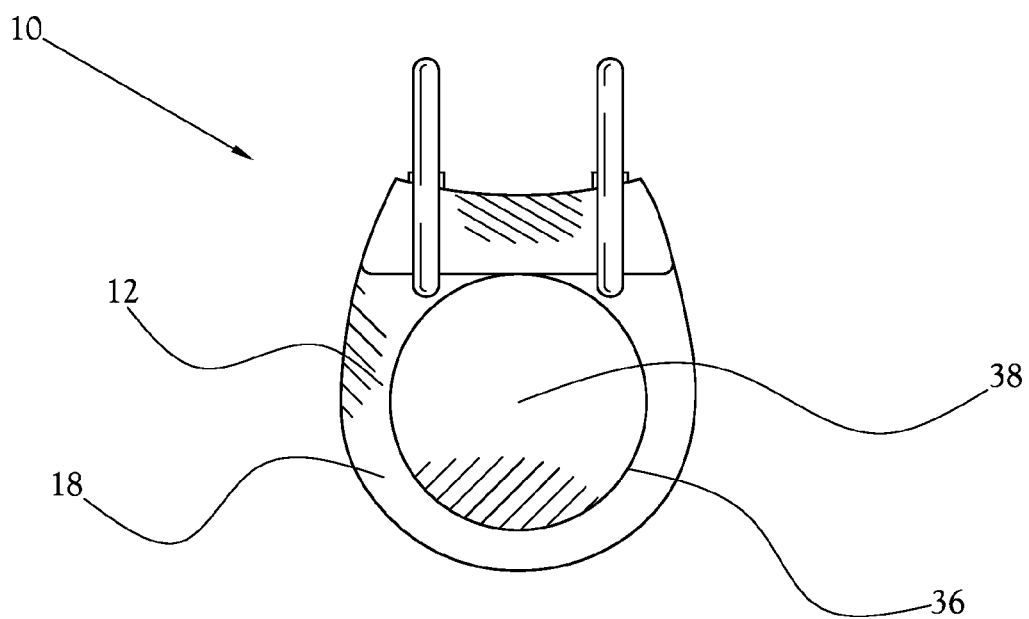
FIG. 3 illustrates a back view of the embodiment of the pet accessory pendant depicted in FIG. 1.

FIG. 3 illustrates, in greater detail, a rear elevation view of the embodiment of the pet accessory pendant 10 as depicted in FIG. 1. The housing 12 optionally provides access to one or more of the pet accessory components. As illustrated in FIG. 3, the back surface 18 of the housing 12 is provided with an opening 36 and cover 38. When the cover 38 is removed from the housing 12, the opening 36 allows the animal owner to access the pet accessory components. For example, in one embodiment, the opening 36 and cover 38 allow the animal owner to replace the pet accessory battery. The depicted opening 36 is circular and sized to receive a conventional pet accessory battery. Furthermore, in one embodiment, the opening 36 is further equipped with a seal, which cooperates with the cover 38 to create a substantially air/water tight seal to protect the pet accessory components from the environment.

Figure 4:
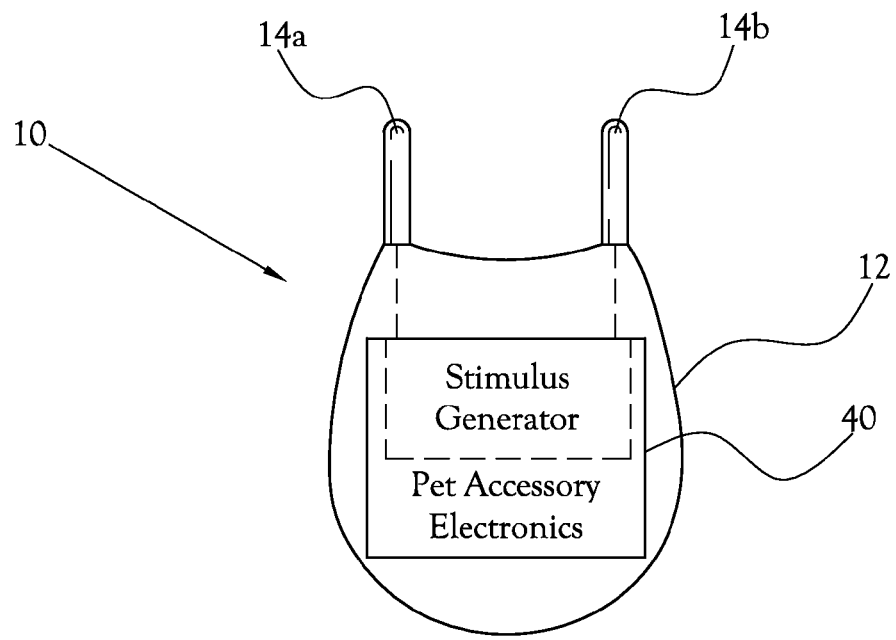
FIG. 4 illustrates a block diagram of one embodiment of the pet accessory pendant.

FIG. 4 illustrates a block diagram of one embodiment of the pet accessory pendant 10. More specifically, the pet accessory pendant 10 is configured to be utilized in the functionality for a particular pet accessory. For example, in the illustrated embodiment, the pet accessory pendant 10 is utilized to administer an electrical stimulus. The pet accessory pendant 10 includes a housing 12 for pet accessory electronics 40 and two attachment loops 14a, 14b. The attachment loops 14a, 14b of the pet accessory pendant 10 are in electrical communication with the pet accessory electronics 40, such as a stimulus generator. The attachment loops 14a, 14b are electrically conductive and project outward from the housing 12 such that the attachment loops 14a, 14b engage the animal when the pet accessory pendant 10 is secured to the animal collar. In the illustrated embodiment, the attachment loops 14a, 14b are connected to a stimulus generator to deliver an electrical stimulus from the attachment loops 14a, 14b when the pet accessory electronics 40, such as the stimulation unit, are activated.

Figure 5:
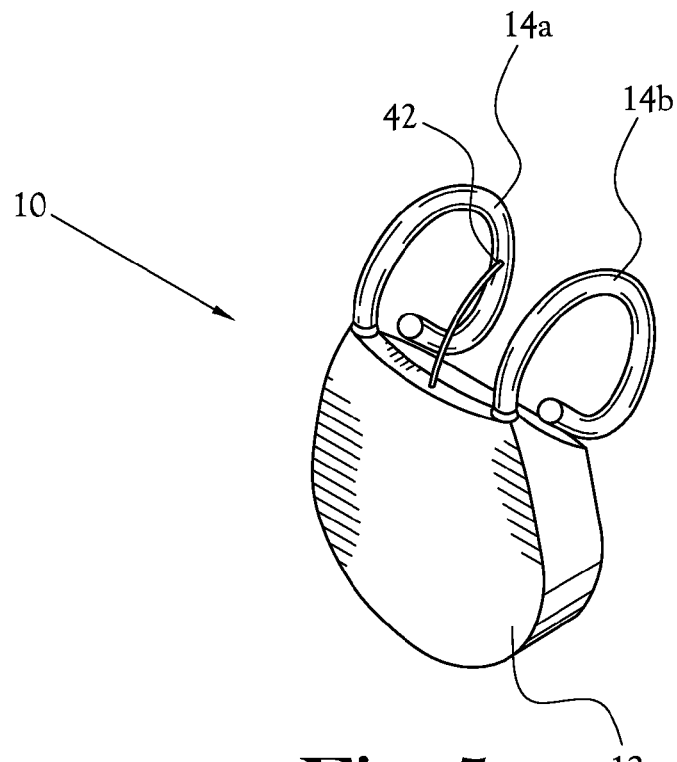
FIG. 5 illustrates a perspective view of an alternate embodiment of the pet accessory pendant.

FIG. 5 is a perspective view of an alternate embodiment of the pet accessory pendant 10. More specifically, the pet accessory pendant 10 includes a housing 12, a probe 42, and attachment loops 14a, 14b.

Figure 6:
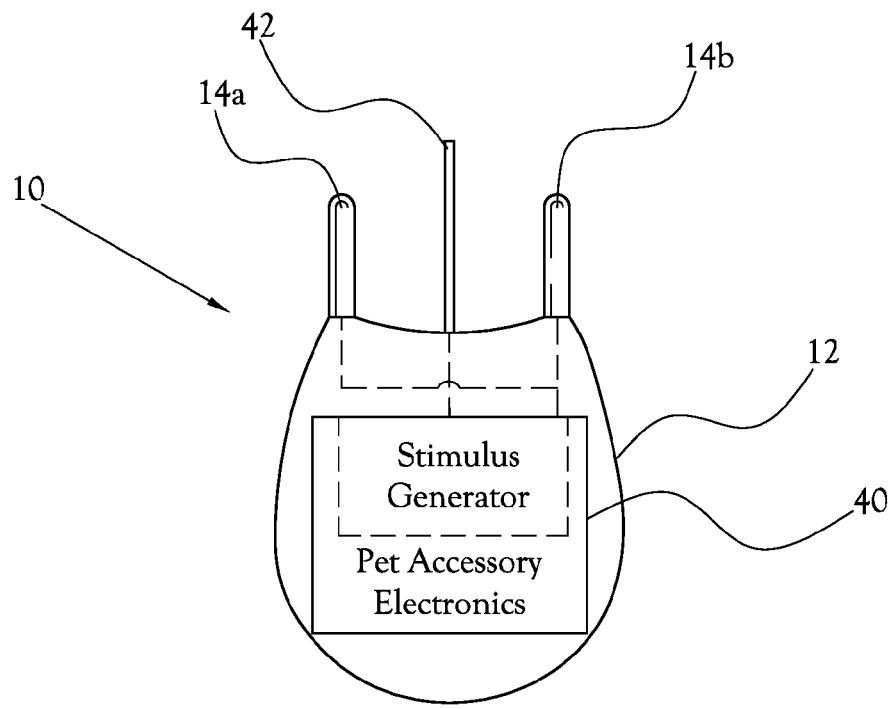
FIG. 6 illustrates a block diagram of one embodiment of the pet accessory pendant depicted in FIG. 5.

FIG. 6 illustrates a block diagram of one embodiment of the pet accessory pendant 10 shown in FIG. 5. In the illustrated embodiment, the pet accessory pendant 10 includes a housing 12 for pet accessory electronics 40, two attachment loops 14a, 14b, and a probe 42. The probe 42 and attachment loops 14a, 14b each project outward from the housing 12 to engage the animal. The probe 42 is in electrical communication with a first connection in the pet accessory electronics 40. The attachment loops 14a, 14b are in electrical communication with a second connection in the pet accessory electronics 40, but are arranged in parallel to provide redundant electrodes for assuring the pet accessory pendant 10 correctly engages the animal's skin. The probe 42 and at least one of the attachment loops 14a, 14b operate to provide an electrical stimulus to the animal when the pet accessory is activated.

Figure 7:
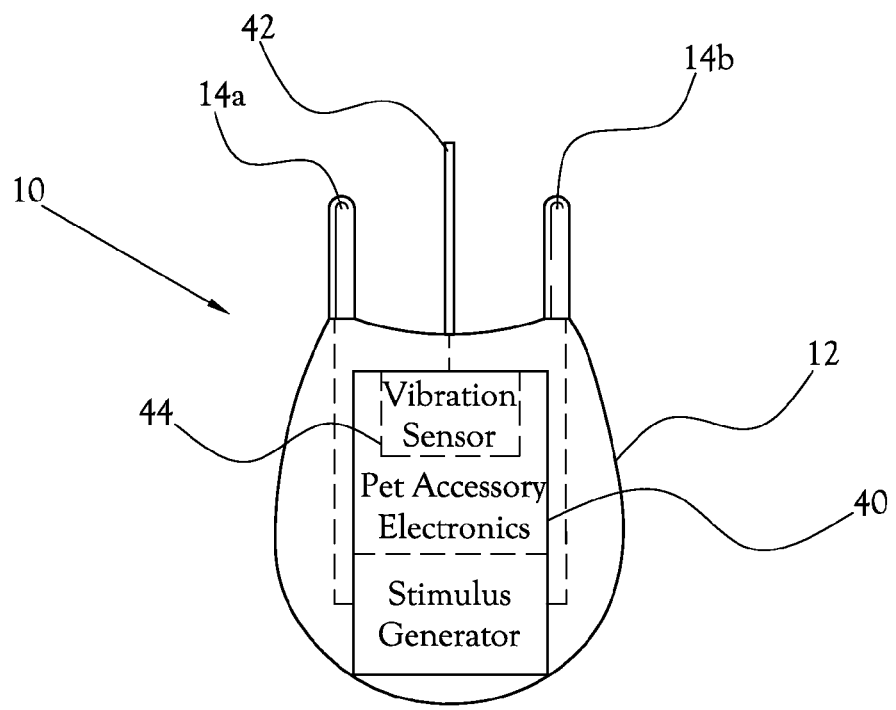
FIG. 7 illustrates a block diagram of an alternate embodiment of the pet accessory pendant depicted in FIG. 5.

FIG. 7 illustrates a block diagram of one embodiment of the pet accessory pendant 10 shown in FIG. 5. In the illustrated embodiment, the pet accessory pendant 10 includes a housing 12 for pet accessory electronics 40, two attachment loops 14a, 14b, and a probe 42. In the illustrated embodiment, the probe 42 is in electrical communication with a vibration sensor 44 used in bark collar applications. The attachment loops 14a, 14b are each in electrical communication with a stimulus generator in the pet accessory electronics 40. When the pet accessory detects a bark, e.g. vibration from the probe, the attachment loops 14a, 14b operate to provide an electrical stimulus to the animal. In alternate embodiments, the pet accessory pendant 10 provides another type of stimulus, which includes, but is not limited to, spray, vibration, and audible stimuli.

Figure 8:
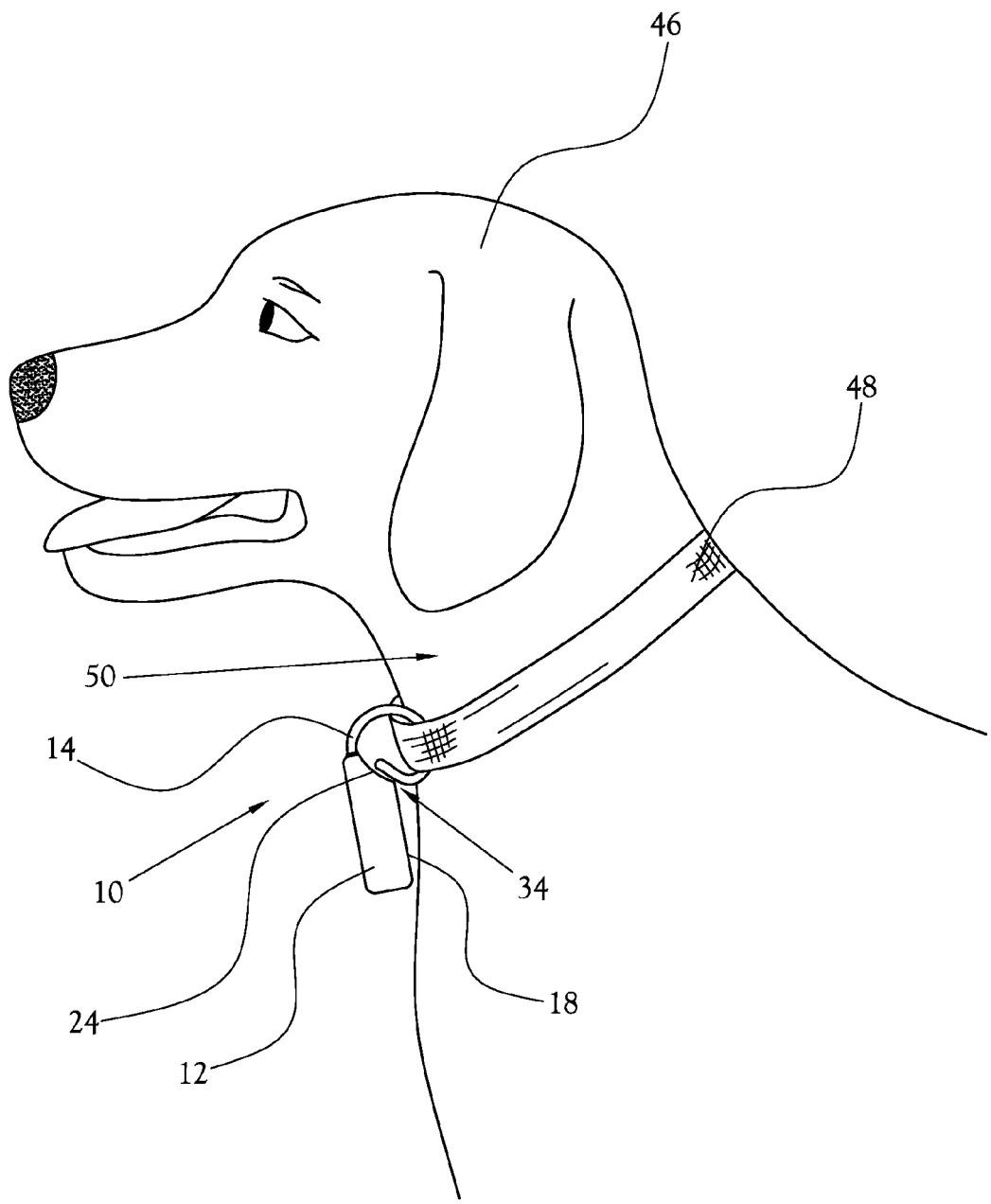
FIG. 8 illustrates one embodiment of the housing for a pet accessory pendant that is carried by an animal.

FIG. 8 illustrates one embodiment of a pet accessory pendant 10 carried by an animal 46. In the illustrated embodiment, the pet accessory pendant 10 is shown secured to the animal collar 48 worn by an animal 46, represented by a dog. Moreover, the pet accessory pendant 10 is carried by the animal 46 such that the pet accessory performs its desired function, e.g., providing position information or a stimulus. For example, in the illustrated embodiment, the pet accessory pendant 10 is positioned at the throat area 50 of the animal 46, wherein the housing 12 is carried in a position having the back surface 18 and angled surface 24 adjacent to the animal 46.

The pet accessory pendant 10 is configured to comfortably rest on the animal collar 48 and minimize any pressure points exerted on the animal 46. First, as discussed previously, the shape and contour of the housing 12 is configured to minimize the housing 12 projecting into the animal 46. Second, the attachment loop 14 is configured such that the arcuate portion faces the animal 46 when secured to the animal collar 48. The large contour of the attachment loops 14 assures that the attachment loops 14 minimally project into the animal 46 for comfort and to minimize the creation of pressure points. For example, in one embodiment, the attachment loop 14 only extends past the animal collar 48 by the diameter of the attachment loop 14.

Furthermore, the pet accessory pendant 10 significantly reduces the problems associated with conventional probes. Specifically, conventional probes require the fitment of the animal collar to be precise such that the conventional probes properly engage the animal's skin. Problems with improper fitment, whether under or over tightening of the collar, can result in improper electrical stimulation or medical conditions such as pressure necrosis. In the illustrated embodiment, the pet accessory pendant 10 is attached on the animal collar 48 such that the attachment loops 14 define dermal probes adjacent to the animal collar 48, thereby minimizing the projection of the dermal probes into the animal 46. Moreover, the housing 12 is configured to rotate on the animal collar 48 for aligning the animal collar 48 with the collar passageway 34 for readily attaching or detaching the pet accessory pendant 10, thereby reducing or eliminating the necessity to adjust the animal collar 46 for proper fitment of the pet accessory. Accordingly, the pet accessory pendant 10 minimizes the pressure points exerted on the animal 46 and reduces or eliminates the requirement to readjust the fitment of the pet accessory, thereby reducing the likelihood of conditions experienced by improper fitment of the pet accessory.

The pet accessory pendant 10 also increases the consistency of a desired trained behavior of the animal 46 when compared to conventional pet accessories. Pet accessories using conventional electrodes are subjected to limited use to avoid problems such as pressure necrosis. When the operable version of the pet accessory is removed or replaced with a non-operable version, i.e. dummy unit, of the pet accessory (without the probes), the animal 46 is likely to learn the difference between operable and non-operable pet accessories resulting in the animal behaving correctly when the operable pet accessory is worn and misbehaving when wearing the non-operable pet accessory. Conversely, for the pet accessory pendant 10, the animal 46 cannot determine whether the worn pet accessory pendant 10 is operable or non-operable. For example, in one embodiment, the pet accessory pendant 10 utilizes the attachment loops 14 for securing to the animal collar 48 and for delivering an electrical stimulus to the animal 46. Thus, each pet accessory pendant 10 provides the same feel and appearance to the animal 46, which reduces the likelihood of the animal differentiating the operable from the non-operable and thereby reducing fluctuations in the animal's behavior.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. A pet accessory pendant comprising:
   a housing for carrying pet accessory components;
   a first attachment loop forming an open loop having a first end in engagement with said housing and a second end spaced apart from said housing to define a collar passageway therebetween, said collar passageway allowing the animal collar worn by an animal to be captured within and extracted from said first attachment loop without requiring the animal collar to be removed from the animal, said first attachment loop configured to penetrate the animal's fur and make contact with the animal's skin; and
   a second attachment loop forming an open loop having a first end in engagement with said housing and a second end spaced apart from said housing to define a collar passageway therebetween, said collar passageway allowing the animal collar worn by an animal to be captured within and extracted from said second attachment loop without requiring the animal collar to be removed from the animal, said second attachment loop configured to penetrate the animal's fur and make contact with the animal's skin.

2. The pet accessory pendant of claim 1 wherein each of said first attachment loop and said second attachment loop defines a substantially curved section between said first end and said second end and projecting from said housing such that said substantially curved section engages the animal when said pet accessory pendant is attached to the animal collar worn by the animal.

3. The pet accessory pendant of claim 1 wherein each of said first attachment loop and said second attachment loop is defined by a portion of the respective attachment loop running substantially parallel to and offset from a portion of said housing.

4. The pet accessory pendant of claim 1 comprising a probe projecting from said housing to engage the animal when said pet accessory pendant is attached to the animal collar worn by the animal, said probe is in mechanical communication with a bark vibration sensor in the pet accessory components.

5. The pet accessory pendant of claim 1 wherein each of said first attachment loop and said second attachment loop is electrically conductive and in electrical communication with a stimulus generator in the pet accessory components, said first attachment loop and said second attachment loop cooperate to selectively administer a stimulus to the animal.

6. The pet accessory pendant of claim 1 comprising a probe projecting from said housing to engage the animal when said pet accessory pendant is attached to the animal collar worn by the animal, each of said first attachment loop, said second attachment loop and said probe being electrically conductive and in electrical communication with a stimulus generator in the pet accessory components, said probe and at least one of said first attachment loop and said second attachment loop cooperate to selectively administer a stimulus to the animal.

7. A pet accessory pendant comprising:
a housing for carrying pet accessory components;
a first attachment loop forming an open loop having a first end in engagement with said housing and a second end spaced apart from said housing to define a collar passageway therebetween, said collar passageway allowing the animal collar worn by an animal to be captured within and extracted from said first attachment loop without requiring the animal collar to be removed from the animal, said first attachment loop defining a substantially curved section between said first end and said second end and projecting from said housing such that said substantially curved section engages the animal when said pet accessory pendant is attached to the animal collar worn by the animal; and
a second attachment loop forming an open loop having a first end in engagement with said housing and a second end spaced apart from said housing to define a collar passageway therebetween, said collar passageway allowing the animal collar worn by an animal to be captured within and extracted from said first attachment loop without requiring the animal collar to be removed from the animal, said second attachment loop defining a substantially curved section between said first end and said second end and projecting from said housing such that said substantially curved section engages the animal when said pet accessory pendant is attached to the animal collar worn by the animal.

8. The pet accessory pendant of claim 7 wherein each of said first attachment loop and said second attachment loop is defined by a portion of the respective attachment loop running substantially parallel to and offset from a portion of said housing.

9. The pet accessory pendant of claim 7 wherein each of said first attachment loop and said second attachment loop are configured to penetrate the animal's fur and make electrical contact with the animal's skin.

10. The pet accessory pendant of claim 7 comprising a probe projecting from said housing to engage the animal when said pet accessory pendant is attached to the animal collar worn by the animal, said probe is in mechanical communication with a bark vibration sensor in the pet accessory components.

11. The pet accessory pendant of claim 7 wherein each of said first attachment loop and said second attachment loop is electrically conductive and in electrical communication with a stimulus generator in the pet accessory components, said first attachment loop and said second attachment loop cooperate to selectively administer a stimulus to the animal.

12. The pet accessory pendant of claim 7 comprising a probe projecting from said housing to engage the animal when said pet accessory pendant is attached to the animal collar worn by the animal, each of said first attachment loop, said second attachment loop and said probe being electrically conductive and in electrical communication with a stimulus generator in the pet accessory components, said probe and at least one of said first attachment loop and said second attachment loop cooperate to selectively administer a stimulus to the animal.

13. A pet accessory pendant comprising:
a housing for carrying pet accessory components; and
a first attachment loop forming an open loop having a first end in engagement with said housing and a second end spaced apart from said housing to define a collar passageway therebetween, said collar passageway allowing the animal collar worn by an animal to be captured within and extracted from said first attachment loop without requiring the animal collar to be removed from the animal, said first attachment loop defining a substantially curved section between said first end and said second end and projecting from said housing such that said substantially curved section engages the animal when said pet accessory pendant is attached to the animal collar worn by the animal.

14. The pet accessory pendant of claim 13 comprising a probe projecting from said housing to engage the animal when said pet accessory pendant is attached to the animal collar worn by the animal, said first attachment loop and said probe are electrically conductive and in electrical communication with a stimulus generator in the pet accessory components, said probe and said first attachment loop cooperate to selectively administer a stimulus to the animal.

15. The pet accessory pendant of claim 13 comprising a second attachment loop forming an open loop having a first end in engagement with said housing and a second end spaced apart from said housing to define a collar passageway therebetween, said collar passageway allowing the animal collar worn by an animal to be captured within and extracted from said second attachment loop without requiring the animal collar to be removed from the animal, said second attachment loop defining a substantially curved section between said first end and said second end and projecting from said housing such that said substantially curved section engages the animal when said pet accessory pendant is attached to the animal collar worn by the animal.

16. The pet accessory pendant of claim 15 wherein each of said first attachment loop and said second attachment loop is defined by a portion of the respective attachment loop running substantially parallel to and offset from a portion of said housing.

17. The pet accessory pendant of claim 15 wherein each of said first attachment loop and said second attachment loop are configured to penetrate the animal's fur and make electrical contact with the animal's skin.

18. The pet accessory pendant of claim 15 wherein each of said first attachment loop and said second attachment loop is electrically conductive and in electrical communication with a stimulus generator in the pet accessory components, said first attachment loop and said second attachment loop cooperate to selectively administer a stimulus to the animal.

19. The pet accessory pendant of claim 15 comprising a probe projecting from said housing to engage the animal when said pet accessory pendant is attached to the animal collar worn by the animal, said probe is in mechanical communication with a bark vibration sensor in the pet accessory components.

* * * * *